Jan. 15, 1957  C. E. ADAMS  2,777,465
ANTIFRICTION BEARING SUPPORTED SPOOL
Filed Sept. 5, 1951

INVENTOR.
CECIL E. ADAMS
BY
Herschel C. Omohundro
Attorney

United States Patent Office 2,777,465
Patented Jan. 15, 1957

2,777,465

ANTIFRICTION BEARING SUPPORTED SPOOL

Cecil E. Adams, Columbus, Ohio, assignor, by mesne assignments, to American Brake Shoe Company, New York, N. Y., a corporation of Delaware Application September 5, 1951, Serial No. 245,239

1 Claim. (Cl. 137—543.23)

This invention relates generally to hydraulics; more specifically it relates to the construction of hydraulic apparatus of the type having relatively movable, telescopic members which are subjected to high fluid pressures.

One instance in which the invention is applicable is in apparatus wherein a piston valve element is disposed for movement in a bore. Heretofore, in such instances the movement of the piston valves was erratic due in part to a binding of the pistons in the bores. It has been found that the binding of the pistons resulted from the seeping of fluid under high pressure between the pistons and the walls at one side of the bores, the force of the fluid urging the pistons against the walls so hard that all the oil or other lubricant was forced out leaving the bare metals in frictional contact. When this condition occurred, an unusual amount of energy was required to free the piston so that it could move again. It is an object of this invention to provide a construction which will overcome the sticking of the valve pistons or other movable elements and thus eliminate the erratic operations.

Another object of the invention is to provide a piece of hydraulic apparatus having telescoping movable members with means for maintaining a concentric relationship between the members whereby the force of the high pressure fluid cannot cause a firmer engagement between the members at one side than at the other.

Still another object of the invention is to provide a suspension or mounting for a piston or spool valve which will permit the piston or spool to move freely under any pressure and either frequently or at widely spaced intervals, the mounting including antifriction elements which maintain the piston or spool concentrical within its bore, even though a sliding fit between the piston or spool and bore walls is required.

A further object of the invention is to provide a hydraulic valve having a casing with a bore in which a piston or spool valve is disposed for sliding movement and to provide ball bearings between the bore and piston or spool walls at circumferentially spaced points so that the piston or spool will be held against lateral movement in the slightest degree and thus be prevented from being forced by fluid pressure against the bore wall.

A still further object of the invention is to provide a hydraulic valve of the type mentioned in the preceding paragraph with retainer or spacer means which serve to prevent the ball bearings from being dislocated and causing undesired interference with the operation of the valve.

Further objects and advantages of the present invention will be apparent from the following description, reference being had to the accompanying drawings wherein a preferred form of embodiment of the invention is clearly shown.

Figure 1:
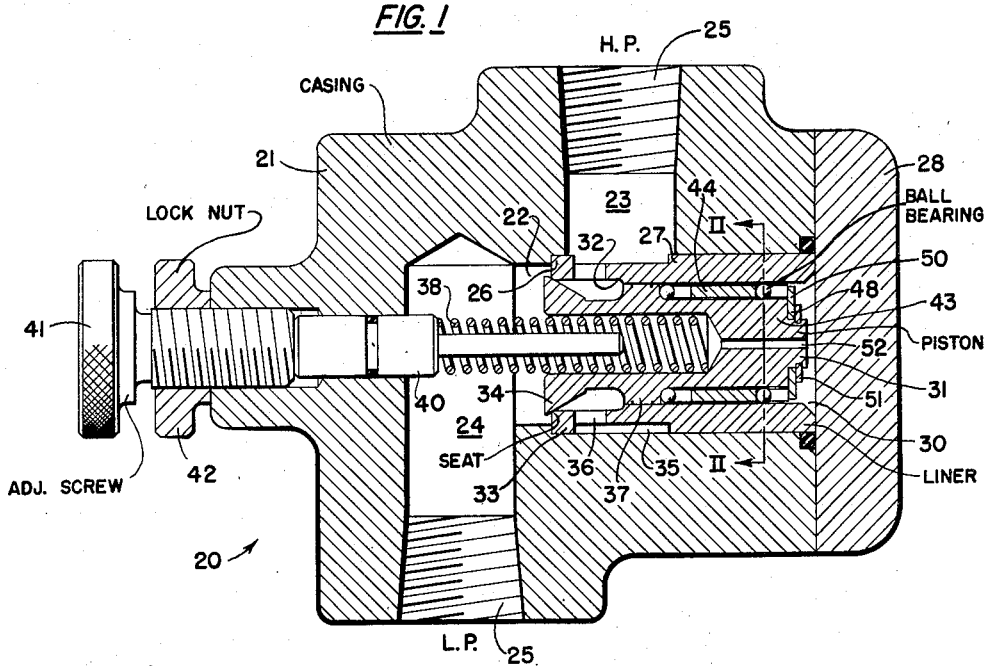
Fig. 1 is a longitudinal sectional view taken through a valve in which the invention has been incorporated.

Referring more particularly to the drawing the numeral 20 designates generally a relief valve which has been selected for the purpose of illustrating the invention. The valve 20 includes a casing or body 21 having an internal bore 22 and inlet and outlet ports 23 and 24, respectively, spaced longitudinally of the bore 22.

Ports 23 and 24 are threaded as at 25 for connecting the body in a hydraulic system. Bore 22 has an enlarged portion to form a shoulder 26 which is used to locate a liner 27 in the body. Bore 22 opens toward one end of the body so that the liner 27 may be inserted. This open end of the bore is closed by a cap 28. The liner 27 also has an internal bore 30 for the reception of a piston valve 31. It will be noted from Fig. 1 that the liner is counterbored at its inner end, as at 32, this end of the liner serving as a seat 33 for the piston valve 31, this member having a conical poppet head 34 for engaging the seat. The liner is externally grooved as at 35 and is provided with laterally extending ports 36 which connect the groove 35 with the counterbored portion. The member 31 has a piston portion 37 disposed for sliding movement in the bore 30 of the liner. This piston portion closely fits the bore 30 so that only a minimum amount of hydraulic fluid may leak past the piston in the normal operation of the valve.

Port 23 constitutes the hydraulic pressure port of the valve and is connected directly with the high pressure section of a hydraulic system. Due to the differential of areas on the piston valve exposed to this hydraulic pressure the latter will tend to move the piston valve toward an open position or one in which the conical poppet head will be spaced from the seat. Movement of the valve in this direction is yieldably resisted by a coil spring 38 which is disposed between the piston valve and a spring abutment 40 arranged in an opening formed in the body in substantial registration with the bore 22. This spring abutment is adjustable in the opening to vary the resistance offered by the spring 38, an adjuster screw 41 being threaded into the outer end of the opening and maintained in its position of adjustment by a lock nut 42.

Figure 2:
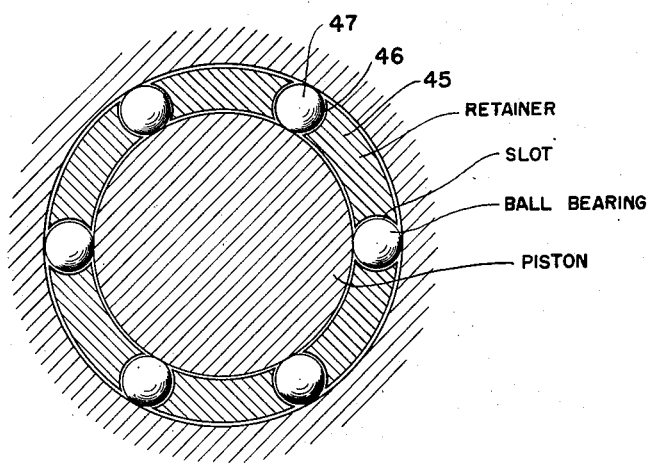
Fig. 2 is a detail sectional view on an enlarged scale taken through the valve on the plane indicated by the line II—II of Fig. 1.

The invention consists in the mounting or suspension of the piston valve in the body or the liner 27. To effect this suspension, the piston valve in this instance has a reduced extension 43 on the opposite side of the piston portion 37 from the head 34. This extension 43 is accurately ground to size and is made concentric with the piston portion 37. This extension is surrounded by means, indicated generally by the numeral 44, for spacing the piston valve from the liner wall of the liner or maintaining it in concentric relationship therewith. This means 44 includes a sleeve-like retainer 45 which is provided with circumferentially spaced slots 46, the slots extending into the retainer from each end thereof. The slots 46 embody a peculiar formation in that they have a generally circular cross section as shown in Fig. 2, the diameter of the cross section being greater than the wall thickness of the retainer in order to cause the slots to open both to the inner and outer sides of the retainer wall. The retainer has an internal diameter greater than the extension 43 and an external diameter less than the internal diameter of the liner 27. The slots are designed to receive ball bearing elements 47 of the diameters of which are substantially equal to the space between the extension 43 and the inner wall of the liner 27. To hold the retainer and the ball bearings in position on the extension 43 the outer end of the piston is further reduced as at 48 to receive a washer 50 which is held in place by a snap ring 51. The retainer is thus held between the piston 37 at one end and the washer 50 at the other. When the piston valve is inserted in the liner 27 the ball bearings 47 engage the inner wall of the liner and serve to hold the piston valve concentric therewith. As the piston valve is inserted the ball bearings 48 move to the ends of the slots in the retainer and slide in the liner until the valve is seated. This disposes the ball bearings at one end of the slots the latter being greater in length than the diameter of the ball bearings; then, when the valve moves, the bearings will roll in the liner and on the piston valve providing a substantially frictionless bearing for the latter.

By holding the piston valve concentric in the liner the degree of leakage of the fluid past the piston is maintained at a minimum. Since the piston valve is prevented from directly contacting the liner except through the ball bearings a minimum amount of resistance to movement will be encountered. The valve will move freely even after long periods of inaction. The particular valve suspension shown and described has been found to greatly improve the action of the valve. The valve responds quickly to pressure changes without chattering or other undesirable action. When the pressure relief valve illustrated in the drawings is in operation fluid under high pressure is introduced through the port 23, when the pressure increases substantially to cause the fluids applied to the differential area to be great enough to overcome the force of the spring 38 the valve will move toward an open position permitting fluid to flow from the inlet port 23, past the seat 33 to the outlet port 24. When this force decreases sufficiently the spring will return the valve to a seated position.

Seepage past the piston 37 may escape through an opening 52 extending longitudinally through the piston valve 31. The simple relief valve disclosed in the drawings has been selected solely for the purpose of illustrating the invention. It should be obvious that the suspension means forming the subject of the invention may be employed in many different hydraulic articles as long as two telescopic members are involved. It is important to the invention that these telescopic members provide a slidable bearing in which it is desirable to avoid metal to metal contact between the elements. It is, therefore, desired to avoid limiting the invention to the application shown but rather to all forms of the invention embraced in the following claim.

I claim:

As an article of manufacture, an adjustable hydraulic pressure relief valve including a body having a bore and spaced high pressure and low pressure ports communicating therewith, a liner sleeve in said bore forming a valve seat between said ports and having means providing communication between the high pressure port and the sleeve interior, an end cap on said body retaining said liner sleeve in position and closing one end of said bore, a valve element in said liner sleeve for controlling communication between said ports, said valve element having a conical head cooperating with said seat and a piston portion disposed in said liner sleeve between said means and said cap, an extension projecting from said piston portion on the opposite side from said head, a set of circumferentially spaced balls between the exterior wall of said extension and the inner wall of said liner sleeve adjacent said piston portion, a second set of balls between the exterior wall of said extension and the inner wall of said liner sleeve adjacent the end of said extension, spacing means between said sets of balls, said sets of balls supporting said head and piston portion in concentric relation with respect to said seat and bore respectively, the piston portion being spaced a limited distance from the wall of said liner sleeve, said body including a second bore in axial alignment with said valve element, a piston in said second bore, spring means disposed between said piston and valve element for urging said conical head into engagement with said seat, an adjusting screw in said second bore engaging said piston for adjusting the pressure applied by said spring to said valve element thereby to adjust the pressure at which said valve will open, and means for locking said adjusting screw in position.

References Cited in the file of this patent

UNITED STATES PATENTS

| | | |
|---|---|---|
| 825,588 | Demarest | July 10, 1906 |
| 826,911 | Tiburtius | July 24, 1906 |
| 1,151,898 | Neal | Aug. 31, 1915 |
| 1,948,375 | Hoerbiger | Feb. 20, 1934 |
| 2,025,721 | Broulhiet | Dec. 31, 1935 |
| 2,043,453 | Vickers | June 9, 1936 |
| 2,080,824 | Kane | May 18, 1937 |
| 2,141,428 | Carroll | Dec. 27, 1938 |
| 2,312,941 | Tucker | Mar. 2, 1943 |
| 2,351,163 | Thomas | June 13, 1944 |
| 2,422,774 | Conner | June 24, 1947 |
| 2,452,117 | Ferger | Oct. 26, 1948 |
| 2,582,974 | Ey | Jan. 22, 1952 |